No. 678,543. Patented July 16, 1901.
G. F. CONNER.
COMBINED DUMPER AND SPREADER.
(Application filed Apr. 1, 1901.)
(No Model.) 2 Sheets—Sheet 1.

No. 678,543. Patented July 16, 1901.
G. F. CONNER.
COMBINED DUMPER AND SPREADER.
(Application filed Apr. 1, 1901.)
(No Model.) 2 Sheets—Sheet 2.

Witnesses:
J. B. Weir
Robert H. Weir

Inventor
George F. Conner
By Mason & Darby
Attys

UNITED STATES PATENT OFFICE.

GEORGE F. CONNER, OF PORT HURON, MICHIGAN.

COMBINED DUMPER AND SPREADER.

SPECIFICATION forming part of Letters Patent No. 678,543, dated July 16, 1901.

Application filed April 1, 1901. Serial No. 53,985. (No model.)

*To all whom it may concern:*

Be it known that I, GEORGE F. CONNER, a citizen of the United States, residing at Port Huron, in the county of St. Clair and State of Michigan, have invented a new and useful Combined Dumper and Spreader, of which the following is a specification.

This invention relates to a combined dumper and spreader.

The object of the invention is to provide a machine which is simple and efficient whereby crushed rock, dirt, or the like may be efficiently deposited in a roadway, for instance, and evenly distributed or spread in a uniform layer or layers.

The invention consists, substantially, in the construction, combination, location, and arrangement of parts, all as will be more fully hereinafter set forth, as shown in the accompanying drawings, and finally pointed out in the appended claims.

Figure 1:
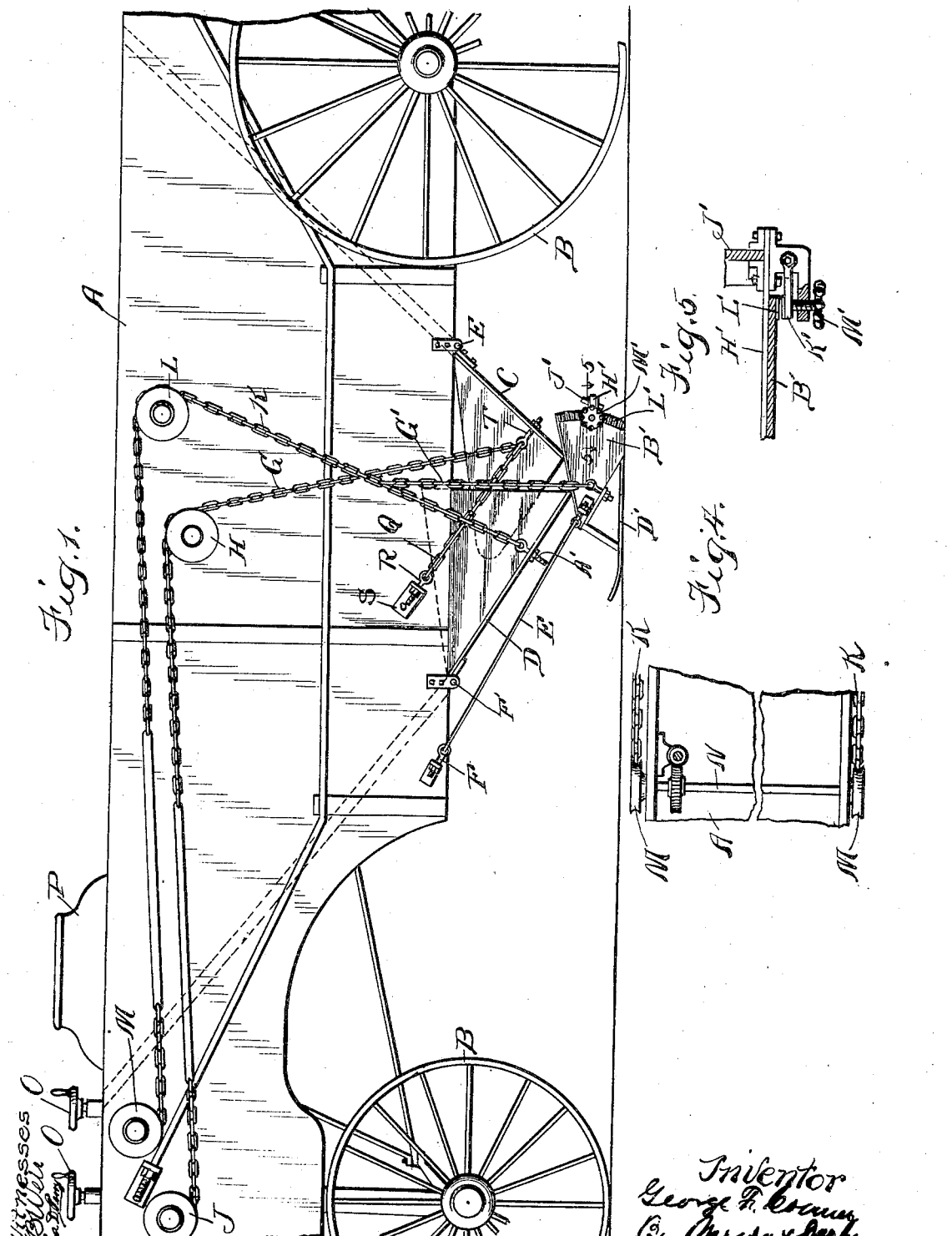
Figure 2:
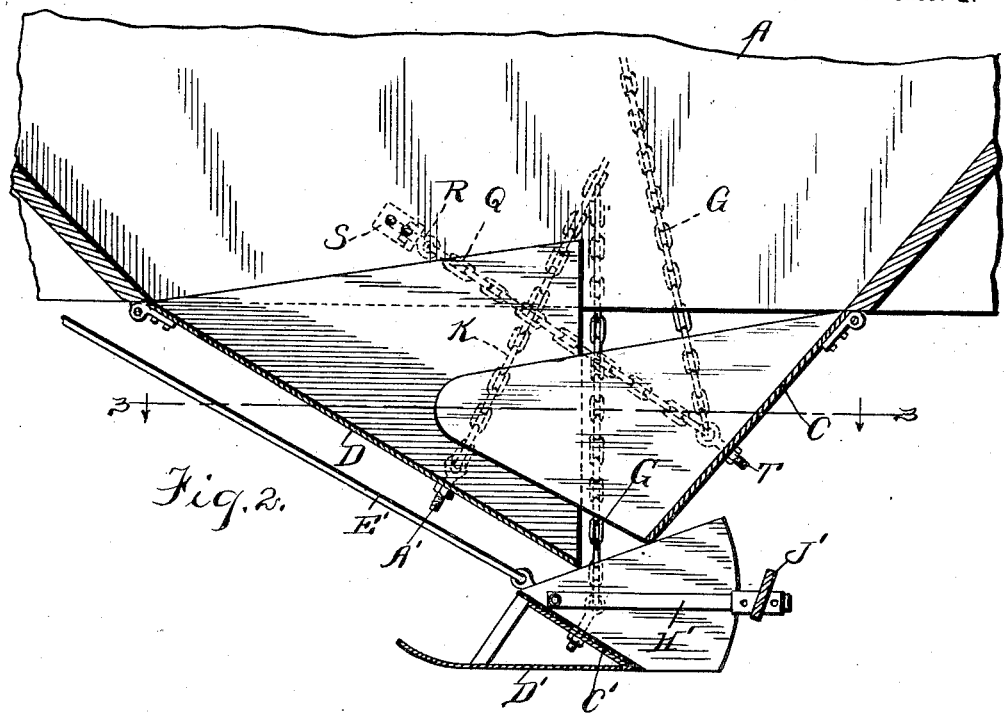
Figure 3:
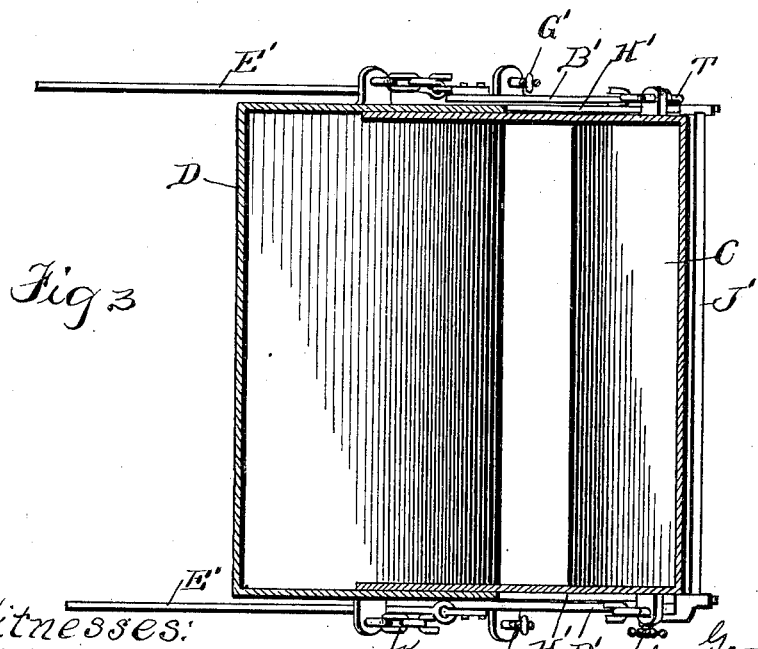

Referring to the accompanying drawings, and to the various views and reference-signs appearing thereon, Figure 1 is a view in side elevation, parts being broken off, of a cart, wagon, or other vehicle, showing the application thereto of a combined dumper and spreader embodying the principles of my invention. Fig. 2 is a broken detail view, somewhat enlarged, in vertical longitudinal section, showing the construction and arrangement of the combined dumper and spreader embodying my invention. Fig. 3 is a view in horizontal section on the line 3 3 of Fig. 2 looking in the direction of the arrows. Fig. 4 is a broken detail view in top plan, parts being in section, showing means for regulating and controlling the dumping operation. Fig. 5 is a broken detail view in section on the line 5 5 of Fig. 1 looking in the direction of the arrows, showing means for adjusting the spreader.

The same part is designated by the same reference-sign wherever it occurs throughout the several views.

In the construction of road-beds, and particularly where a filling of crushed rock, dirt, or the like is required, it is the usual custom to transport the crushed rock, dirt, or the like to the point where the filling is to be made and dump the same, and the spreading thereof is effected by workmen with spades or shovels to secure an even distribution thereof.

It is among the primary purposes of my invention to provide means whereby the dumping and even distribution and spreading of the material are effected at the same time from the cart, wagon, or other vehicle in which the material is transported to the point where the filling is required.

In the accompanying drawings I have shown a construction and arrangement of apparatus embodying the principles of my invention as applied to a cart, wagon, or other vehicle.

Referring to the accompanying drawings, reference-sign A designates the body of the cart, wagon, or other suitable vehicle, which, if desired, may be supported on traction or other wheels B in the usual manner. The body of the wagon, cart, or other vehicle is formed into hopper shape, with relatively movable sides or portions, which may be suitably operated in accordance with the principles of my invention to permit the contents of the wagon, cart, or other vehicle to be deposited or dumped, and by relatively moving or adjusting the movable portions of the hopper the area of opening therethrough for the dumping or discharge of the material from the wagon, cart, or other vehicle may be regulated and controlled.

C designates one of the movable portions of the hopper, and D the other movable portion of such hopper. The portion C is pivotally connected, as at E, to the body of the cart, wagon, or other vehicle, and the portion D of the hopper is pivotally connected to such body, as at F, said pivotally-supported portions extending downwardly and toward each other from their respective points of pivotal connection or support to the body A to form a hopper, and by pivotally supporting said sections C D they may be swung relatively to each other, so as to form an opening therebetween to permit the contents of the wagon, cart, or the like to be discharged or dumped therethrough, and such opening may be regulated to control the dumping or discharge of the material. The desired swinging movements of the sections or portions C D of the hopper may be effected in any suitable or convenient manner. In the particular form shown, to which my invention is not to be limited, I connect a chain or other flexible connection G to the pivoted section C of the hopper and arrange said connections or chains to pass over guide-pulleys H and to sheaves or drums J, upon which such connections may be wound. Similarly I attach one end of a chain or other suitable connection K to the hinged or pivoted section or portion D of the hopper and arrange such chain or connection to pass over guide-pulleys L and to be wound upon sheaves or drums M. The sheaves or drums J M may be independently actuated to take up or pay out the chain or connections G K in order to effect a raising or lowering of the sections or portions C D of the hopper in any simple, suitable, or convenient manner and may be controllable from any convenient point. In the particular form shown as embodying the principles of my invention said sheaves or pulleys may be mounted on shafts, the shaft N carrying the pulleys or sheaves M, (shown most clearly in Fig. 4,) it being understood that a similar arrangement may be provided for effecting the actuation of sheaves or pulleys J. Through suitable gearing controlled by hand-wheels O, arranged in convenient relation to the driver's seat, (indicated at P,) the desired actuation of the raising and lowering connections of sections C and D of the hopper may be effected. In order to efficiently support the section C of the hopper when in its lowermost position, an additional connection Q may be provided and connected at one end to said section C and at the other end to the wagon or cart bed or body, and in order to provide a desirable range of adjustment this connection may comprise a chain, and the end thereof which is connected to the wagon bed or body may be adjustably connected—as, for instance, by means of a threaded bolt R, operating through an angle-plate S, suitably bolted or otherwise mounted upon the wagon bed or body. Of course it is evident that other means may be employed for adjustably connecting the chain Q, and, if desired, the connections of chains Q and G to section C may be made adjustable, as by means of thread-bolt T. Similarly the connection K may be adjustably connected to the section D of the hopper—as, for instance, by thread-bolt A'.

From the foregoing description it will be seen that I provide an exceedingly simple and efficient arrangement for dumping the contents of a wagon, cart, vehicle, or the like and wherein the dumping operation may be adjustably regulated.

In order to effect a distribution and even spreading of the material dumped, as above explained, I provide a spreader comprising side plates B' and a connecting web or bottom C', said spreader being arranged to operate over the surface of the ground, road-bed, or the like on runners or shoes D' or in any other suitable manner and immediately beneath the opening between the free ends or edges of the sections C D of the dumping-hopper, the base or bottom C' of the spreader being downwardly and rearwardly inclined with respect to the line of travel of the vehicle. If desired, and preferably, the spreader may be connected by drag-bars E' to the wagon bed or body, and to secure a desirable range of adjustment to bring the parts into proper position the connection of the drag-bars E' to the spreader and also to the wagon-bed may be effected by suitable adjusting-bolts, as indicated at F'. The drag-bars E', as clearly shown, extend forwardly from the spreader to a convenient point on the body A.

If desired, and in order to raise the spreader from contact with the ground during the transportation of the vehicle with its load of material to be dumped to the point where the dumping is to be effected, said spreader may be connected in any suitable manner with the chain or other connection K, through which section D of the hopper is raised—as, for instance, by means of the chain G'. By this construction it will be seen that when the chain K is actuated to raise the section D of the hopper into closed relation with respect to section C of the hopper the spreader will also be raised, and when the section D is lowered to form an opening for the discharge of the contents of the wagon, cart, or the like the spreader is also lowered. Upon links H', pivotally mounted upon the side flanges B' of the spreader and extending rearwardly with respect to the direction of travel of the spreader, is carried a spreader-bar J', arranged to extend transversely of the machine and preferably in a vertical and rearwardly-inclined relation with respect to the line of travel of the machine. The height of the spreader-bar above the surface of the ground may be adjustably regulated in any suitable or convenient manner. As illustrative of one form of adjusting means for this purpose I have shown a link K', provided with a tooth arranged to engage a rack L', formed on or carried by the side flange B' of the spreader, the engagement of said link and rack being maintained in any desired position of adjustment by a hand-screw M'. The operation of this feature of my invention is as follows: When the sections C D of the hopper are manipulated to effect a discharge or dumping of the material or contents of the wagon bed or body, such contents or material falls upon the bottom C' of the spreader and is directed thereby downwardly and rearwardly to the surface of the ground, road-bed, or the like, and the spreader-bar J', operating over the surface of the material thus deposited or dumped upon the ground, serves to spread and evenly distribute the same, thus avoiding the necessity for the services of laborers to perform this work and enabling the dumping and spreading operations to be effected by the driver of the cart, wagon, or the like.

While I have described my invention as applied to grading-machines in the construction of road-beds, it is obvious that my invention may be applied to other purposes and uses—such, for instance, as the dumping and spreading of fertilizer or for any other purpose. I therefore do not desire to be limited in respect of the use to which my invention is to be put.

It is to be understood that many variations and changes in the details of construction and arrangement would readily suggest themselves to persons skilled in the art and still fall within the spirit and scope of my invention. I do not desire, therefore, to be limited or restricted to the exact details of construction and arrangement shown and described; but, Having now set forth the object and nature of my invention and the best form of construction and arrangement embodying the principles thereof in which I at present contemplate carrying the same into practical operation and having explained the purpose, function, and mode of operation thereof, what I claim as new and useful and of my own invention, and desire to secure by Letters Patent, is—

1. The combination with a wagon, cart or other vehicle body, of a dumping-hopper comprising sections independently hinged or pivoted, and a spreader also supported by said body and arranged adjacent to the delivery-opening of said hopper for evenly distributing the material dumped by such hopper, as and for the purpose set forth.

2. In an apparatus of the class described, a wagon or cart bed or body, a dumper comprising sections or portions independently pivoted to such wagon-body, and means for independently raising and lowering said sections or portions to open or close the same and to regulate the opening therebetween, and a spreading device arranged adjacent to the delivery-opening of said dumper to receive the material therefrom, and operating to evenly spread and distribute the same, as and for the purpose set forth.

3. In an apparatus of the class described, a wagon-body, a dumping-hopper comprising movable sections and means for relatively moving said sections to open or close the space therebetween and for regulating such space, and a spreading device carried by the wagon-body and arranged adjacent to the delivery-opening of said hopper to receive the material dumped therefrom, and operating to evenly spread and distribute the same, as and for the purpose set forth.

4. In an apparatus of the class described, a wagon-body, a dumper comprising relatively moving sections and means for moving said sections to open or close the space therebetween, and a spreader supported by the wagon-body and operating over the surface of the ground adjacent to the opening between such sections, as and for the purpose set forth.

5. In an apparatus of the class described, a wagon-body, a dumping-hopper comprising sections or portions independently pivoted to such body, means for independently swinging such sections about their pivotal connections, and a spreader carried by the wagon-body and arranged adjacent to the delivery-opening of said hopper to receive the material delivered therefrom, and operating to evenly distribute and spread the same, all combined and arranged as and for the purpose set forth.

6. In an apparatus of the class described, a wagon-body, a dumper carried thereby, and a spreader connected to said wagon-body and operating over the surface of the ground at a point adjacent to the delivery-opening of said dumper, as and for the purpose set forth.

7. In an apparatus of the class described, a wagon-body, dumper-sections independently connected thereto, means for relatively moving said sections, a spreader arranged beneath the point of delivery of said dumper and including an inclined transversely-extending bar for evenly spreading and distributing the material discharged from said dumper, as and for the purpose set forth.

8. In an apparatus of the class described, a wagon-body, a dumper and means for controlling the discharge of material from said dumper, of a spreader suspended from the wagon-body adjacent to the discharge-opening of said dumper and including pivotally-mounted links and a transverse bar carried by said links, as and for the purpose set forth.

9. In an apparatus of the class described, a wagon-body, a dumper carried thereby, a spreader arranged beneath the point of delivery from said dumper and including side flanges and a connecting-bottom, said bottom being downwardly and rearwardly inclined with respect to the line of travel of the machine, rearwardly-extending links pivotally connected to said flanges, and a transverse bar supported by said links, as and for the purpose set forth.

10. In an apparatus of the class described, a wagon-body, a dumping-hopper carried thereby, a spreader arranged beneath the point of delivery from said hopper and including side flanges and a connecting base portion, a transverse spreader-bar and means for adjustably supporting said spreader-bar upon said flanges, as and for the purpose set forth.

11. In an apparatus of the class described, a wagon-body, a dumping-hopper carried thereby, a spreader arranged beneath said dumping-hopper at the point of delivery therefrom, a drag-bar connecting said spreader to said wagon-body, and a spreader-bar adjustably carried by said spreader, as and for the purpose set forth.

12. In an apparatus of the class described, a wagon-body, a dumping-hopper including a movable section or portion supported upon said wagon-body, means for raising and lowering said section or portion to close or open said hopper, a spreader operating beneath the point of delivery from said hopper, and connections between said spreader and said movable section whereby when the latter is raised to close the hopper said spreader is also raised, as and for the purpose set forth.

13. In an apparatus of the class described, a wagon-body, a dumping-hopper comprising independently-pivoted sections or portions, operating-gearing, independent connections between such gearing and said independently-movable sections whereby said sections may be relatively moved to open or close said hopper, a spreader arranged beneath the point of delivery from said hopper, a spreader-bar carried by said spreader, and means whereby when said sections are relatively moved to close said hopper said spreader is also raised out of contact with the ground, as and for the purpose set forth.

In witness whereof I have hereunto set my hand, this 25th day of March, 1901, in the presence of the subscribing witnesses.

GEORGE F. CONNER.

Witnesses:
   H. B. HOYT,
   G. R. HAIGH.